(12) United States Patent
Jia et al.

(10) Patent No.: US 10,481,434 B2
(45) Date of Patent: Nov. 19, 2019

(54) FLEXIBLE LIQUID CRYSTAL DISPLAY PANEL AND DISPLAY DEVICE COMPRISING FIRST AND SECOND NEGATIVE A PLATE COMPENSATION FILMS AND A POSITIVE C PLATE COMPENSATION FILM BETWEEN A SECOND FLEXIBLE SUBSTRATE AND THE FIRST NEGATIVE A PLATE

(71) Applicant: BOE TECHNOLOGY GROUP CO., LTD., Beijing (CN)

(72) Inventors: Qian Jia, Beijing (CN); Yingtao Wang, Beijing (CN); Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 18 days.

(21) Appl. No.: 15/210,788

(22) Filed: Jul. 14, 2016

(65) Prior Publication Data
US 2017/0192275 A1    Jul. 6, 2017

(30) Foreign Application Priority Data
Jan. 4, 2016 (CN) .......................... 2016 1 0005512

(51) Int. Cl.
*G02F 1/13363* (2006.01)
*G02F 1/1333* (2006.01)
(Continued)

(52) U.S. Cl.
CPC .... *G02F 1/13363* (2013.01); *G02F 1/133305* (2013.01); *G02F 1/133528* (2013.01);
(Continued)

(58) Field of Classification Search
CPC ............. G02F 2413/13; G02F 2413/14; G02F 2413/03; G02F 2202/40; G02F 2413/11
See application file for complete search history.

(56) References Cited

U.S. PATENT DOCUMENTS

2006/0134822 A1* 6/2006 Liu ..................... H01L 51/0021
                                                    438/99
2007/0058118 A1    3/2007 Cirkel
(Continued)

FOREIGN PATENT DOCUMENTS

CN    1178918    4/1998
CN    1795411    6/2006
(Continued)

OTHER PUBLICATIONS

"First office action," CN Application No. 20160005512.6 (dated Apr. 25, 2018).

*Primary Examiner* — Paul C Lee
(74) *Attorney, Agent, or Firm* — Womble Bond Dickinson (US) LLP

(57) ABSTRACT

A flexible liquid crystal display panel and a display device are disclosed. The flexible liquid crystal display panel comprises: a first flexible substrate and a second flexible substrate arranged oppositely; a first polarizer on a side of the first flexible substrate facing away from the second flexible substrate; a second polarizer on a side of the second flexible substrate facing away from the first flexible substrate; and a positive C plate compensation film and a first negative A plate compensation film arranged on the second flexible substrate; the positive C plate compensation film is arranged between the second flexible substrate and the first negative A plate compensation film. The light leakage defect of a visual angle greater than zero in a dark state can be overcome, which occurs since the absorption axis of the first polarizer and the absorption axis of the second polarizer are not perpendicular to each other.

20 Claims, 10 Drawing Sheets

(51) Int. Cl.
*G02F 1/1335* (2006.01)
*G02F 1/1343* (2006.01)

(52) U.S. Cl.
CPC .. *G02F 1/134363* (2013.01); *G02F 2201/121* (2013.01); *G02F 2201/123* (2013.01); *G02F 2202/40* (2013.01); *G02F 2413/03* (2013.01); *G02F 2413/07* (2013.01); *G02F 2413/11* (2013.01); *G02F 2413/13* (2013.01); *G02F 2413/14* (2013.01)

(56) References Cited

U.S. PATENT DOCUMENTS

2007/0279553 A1* 12/2007 Yoda .................... G02F 1/13363
 349/96
2008/0284948 A1* 11/2008 Koishi ................ G02B 5/3083
 349/96
2012/0212797 A1* 8/2012 Luan ....................... G02F 1/167
 359/296
2015/0378079 A1* 12/2015 Takagi ..................... B32B 7/02
 359/489.07

FOREIGN PATENT DOCUMENTS

| CN | 203930105 | 11/2014 |
| JP | 2010054895 | 3/2010 |
| KR | 20080073244 | 8/2008 |

* cited by examiner

FLEXIBLE LIQUID CRYSTAL DISPLAY PANEL AND DISPLAY DEVICE COMPRISING FIRST AND SECOND NEGATIVE A PLATE COMPENSATION FILMS AND A POSITIVE C PLATE COMPENSATION FILM BETWEEN A SECOND FLEXIBLE SUBSTRATE AND THE FIRST NEGATIVE A PLATE

RELATED APPLICATIONS

The present application claims the benefit of Chinese Patent Application No. 201610005512.6, filed on Jan. 4, 2016, the entire disclosure of which is incorporated herein by reference.

TECHNICAL FIELD

The present invention relates to the field of display technology, particularly to a flexible liquid crystal display panel and a display device.

BACKGROUND

With the rapid development of display technology, flexible display panel has advantages such as thin type, light weight, shatterproof, flexible, and energy saving; liquid crystal display (LCD) panel has advantages such as low power consumption, high display quality, no electromagnetic radiation, and a wide range of applications. Therefore, flexible liquid crystal display panel has become a hotspot of research in the field of display.

A polyimide (PI) film is typically used in an existing flexible liquid crystal display panel as a flexible substrate, since the PI film is able to withstand high temperature close to 400. In such a manner, when thin film transistors are subsequently manufactured on the PI film, the PI film can not be damaged by the high temperature environment for forming the active layer in the thin film transistor.

When a flexible liquid crystal display panel is in a dark state, an in-plane retardation of a PI film Ro=0 nm; a thickness retardation of the PI film Rth is about 2330 nm. In such a situation, the PI film is equivalent to a negative C plate, of which the retardation in a certain visual angle is $$\Gamma_\varepsilon = \frac{2\pi}{\lambda} n_o d \left( \sqrt{1 - \frac{\sin^2\theta_0}{n_e^2}} - \sqrt{1 - \frac{\sin^2\theta_0}{n_o^2}} \right);$$

λ is the wavelength of incident light; no is the refractive index of ordinary light; $n_e$ is the refractive index of extraordinary light; d is the thickness of the negative C plate; $\theta_0$ is a polar angle (i.e., the angle between the human visual line and the axis perpendicular to the center of the display panel). FIG. 1 is a simulated diagram of a retardation of a negative C plate in different visual angles. As can be seen from FIG. 1, the retardation of the negative C plate changes periodically. The retardation of the negative C plate in different visual angles will cause serious problem of light leakage when a flexible liquid crystal display panel is in a dark state. As can be seen from FIG. 2, regardless of a color filter layer, the transmittance of a flexible liquid crystal display panel in a dark state can be up to 26%. In FIG. 1 and FIG. 2, 0°~360° represent azimuthal angles; 0°~90° represent polar angles; the azimuthal angle and the polar angle represent a visual angle together.

Moreover, an angle formula for absorption axes of an upper polarizer and lower polarizer in a flexible liquid crystal display panel is $$\cos\psi = \frac{-\sin^2\theta_k \cos(\phi_2 - \phi_k)\cos(\phi_k - \phi_1)}{\sqrt{1 - \sin^2\theta_k \cos^2(\phi_k - \phi_1)} \sqrt{1 - \sin^2\theta_k \cos^2(\phi_2 - \phi_k)}};$$

ψ is an angle between the absorption axis of the upper polarizer and the absorption axis of the lower polarizer; $\phi_1$ and $\phi_2$ are respectively azimuthal angles of the upper polarizer and lower polarizer when the visual angle is zero; $\phi_k$ is an azimuthal angle of human eye when the visual angle is greater than zero; $\theta_k$ is a polar angle of human eye when the visual angle is greater than zero. When the visual angle is greater than zero, the absorption axis of the upper polarizer and the absorption axis of the lower polarizer are not perpendicular to each other, which also causes a problem of light leakage when a flexible liquid crystal display panel is in a dark state.

SUMMARY

To this end, the embodiments of the present invention provide a flexible liquid crystal display panel and a display device; the light leakage defect of a visual angle greater than zero for a flexible liquid crystal display panel in a dark state can be overcome.

Therefore, an embodiment of the present invention provides a flexible liquid crystal display panel. The flexible liquid crystal display panel comprises: a first flexible substrate and a second flexible substrate arranged oppositely; a first polarizer arranged on a side of the first flexible substrate facing away from the second flexible substrate; a second polarizer arranged on a side of the second flexible substrate facing away from the first flexible substrate; and a positive C plate compensation film and a first negative A plate compensation film arranged on the second flexible substrate; the positive C plate compensation film is arranged between the second flexible substrate and the first negative A plate compensation film.

In a possible implementation, in the flexible liquid crystal display panel provided by the embodiment of the present invention, the flexible liquid crystal display panel further comprises: a liquid crystal cell located between the first flexible substrate and the second flexible substrate; the liquid crystal cell comprises a common electrode and a pixel electrode insulated from each other, which are arranged on a side of the second flexible substrate facing the first flexible substrate to generate a transverse electric field parallel to the second flexible substrate.

In a possible implementation, in the flexible liquid crystal display panel provided by the embodiment of the present invention, the flexible liquid crystal display panel further comprises: a second negative A plate compensation film arranged between the second flexible substrate and the liquid crystal cell; the positive C plate compensation film and the first negative A plate compensation film are arranged on a side of the second flexible substrate facing away from the liquid crystal cell; an optic axis of the first negative A plate compensation film is parallel to an absorption axis of the first polarizer; an in-plane retardation of the first negative A plate compensation film is between −80 nm to −100 nm; an optic axis of the positive C plate compensation film is perpendicular to a surface of the second flexible substrate; an in-plane retardation of the positive C plate compensation film is between 2320 nm to 2380 nm; an optic axis of the second negative A plate compensation film is parallel to an absorption axis of the second polarizer; an in-plane retardation of the second negative A plate compensation film is between −80 nm to −100 nm.

In a possible implementation, in the flexible liquid crystal display panel provided by the embodiment of the present invention, the positive C plate compensation film and the first negative A plate compensation film are arranged on a side of the second flexible substrate facing away from the liquid crystal cell; an optic axis of the positive C plate compensation film is perpendicular to a surface of the second flexible substrate; an in-plane retardation of the positive C plate compensation film is between 2360 nm to 2440 nm; an optic axis of the first negative A plate compensation film is parallel to an absorption axis of the first polarizer; an in-plane retardation of the first negative A plate compensation film is between −120 nm to −150 nm.

In a possible implementation, in the flexible liquid crystal display panel provided by the embodiment of the present invention, the positive C plate compensation film and the first negative A plate compensation film are arranged between the second flexible substrate and the liquid crystal cell; an optic axis of the positive C plate compensation film is perpendicular to a surface of the second flexible substrate; an in-plane retardation of the positive C plate compensation film is between 2400 nm to 2450 nm; an optic axis of the first negative A plate compensation film is parallel to an absorption axis of the second polarizer; an in-plane retardation of the first negative A plate compensation film is between −120 nm to −160 nm.

In a possible implementation, in the flexible liquid crystal display panel provided by the embodiment of the present invention, the flexible liquid crystal display panel further comprises: a positive A plate compensation film arranged between the second flexible substrate and the second polarizer; the positive C plate compensation film and the first negative A plate compensation film are arranged between the second flexible substrate and the liquid crystal cell; an optic axis of the positive C plate compensation film is perpendicular to a surface of the second flexible substrate; an in-plane retardation of the positive C plate compensation film is between 2450 nm to 2520 nm; an optic axis of the first negative A plate compensation film is parallel to an absorption axis of the second polarizer; an in-plane retardation of the first negative A plate compensation film is between −80 nm to −110 nm; an optic axis of the positive A plate compensation film is parallel to an absorption axis of the first polarizer; an in-plane retardation of the positive A plate compensation film is between 50 nm to 90 nm.

In a possible implementation, in the flexible liquid crystal display panel provided by the embodiment of the present invention, an optic axis of the second flexible substrate is perpendicular to a surface of the second flexible substrate.

In a possible implementation, in the flexible liquid crystal display panel provided by the embodiment of the present invention, a material of the first flexible substrate is flexible glass.

In a possible implementation, in the flexible liquid crystal display panel provided by the embodiment of the present invention, a material of the second flexible substrate is organic resin.

In a possible implementation, in the flexible liquid crystal display panel provided by the embodiment of the present invention, a material of the second flexible substrate is polyimide.

An embodiment of the present invention provides a display device. The display device comprises the above mentioned flexible liquid crystal display panel.

The embodiments of the present invention provide a flexible liquid crystal display panel and a display device. The flexible liquid crystal display panel comprises: a first flexible substrate and a second flexible substrate arranged oppositely; a first polarizer arranged on a side of the first flexible substrate facing away from the second flexible substrate; a second polarizer arranged on a side of the second flexible substrate facing away from the first flexible substrate; and a positive C plate compensation film and a first negative A plate compensation film arranged on the second flexible substrate; the positive C plate compensation film is arranged between the second flexible substrate and the first negative A plate compensation film. With such an arrangement, the light leakage defect of a visual angle greater than zero in a dark state can be overcome, which occurs since the absorption axis of the upper polarizer and the absorption axis of the lower polarizer are not perpendicular to each other.

BRIEF DESCRIPTION OF THE DRAWINGS

FIG. 3b is a schematic diagram of a Poincare sphere corresponding to the flexible liquid crystal display panel shown in FIG. 3a;

FIG. 4b is a schematic diagram of a Poincare sphere corresponding to the flexible liquid crystal display panel shown in FIG. 4a;

FIG. 5b is a schematic diagram of a Poincare sphere corresponding to the flexible liquid crystal display panel shown in FIG. 5a;

FIG. 6b is a schematic diagram of a Poincare sphere corresponding to the flexible liquid crystal display panel shown in FIG. 6a.

DETAILED DESCRIPTION OF THE INVENTION

Figure 1:
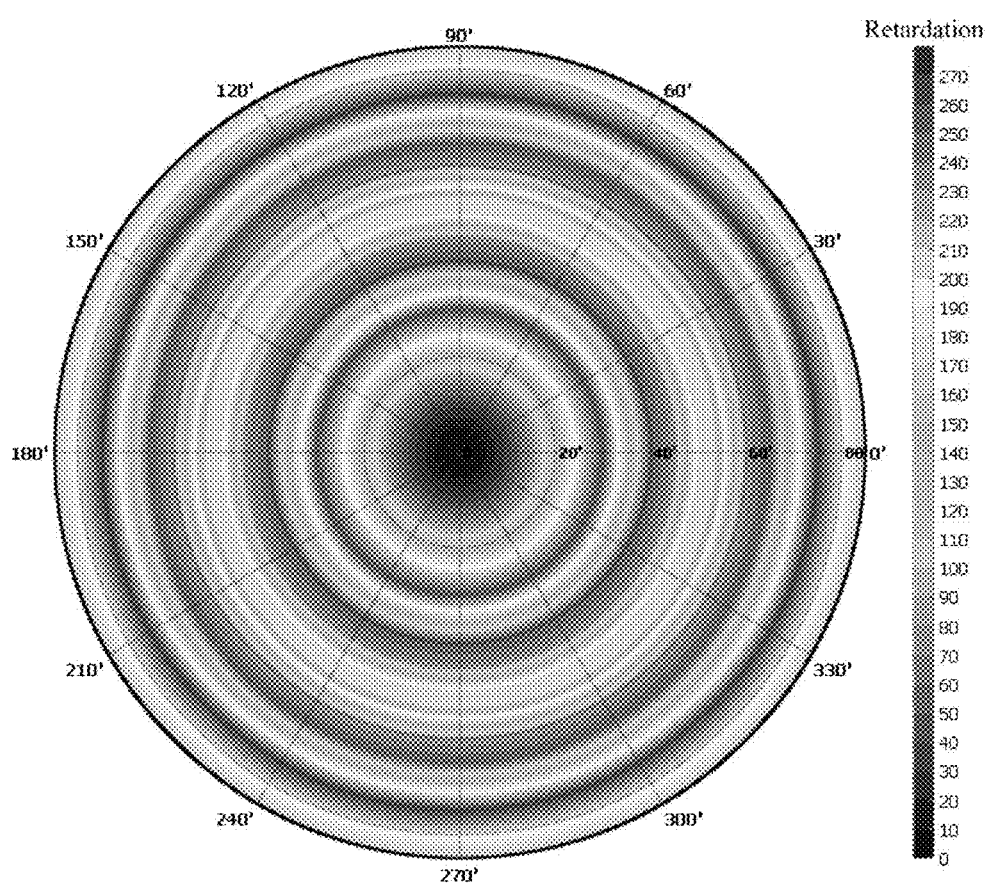
FIG. 1 is a simulated diagram of a retardation of a negative C plate in different visual angles.

The flexible liquid crystal display panel and the display device provided by the embodiments of the invention will be described below in detail in connection with the drawings.

The shapes and thickness of the film layers in the drawings do not reflect the real scale of the film layers, but to schematically illustrate the content of the invention.

As shown in FIG. 3a, FIG. 4a, FIG. 5a and FIG. 6a, a flexible liquid crystal display panel provided by the embodiments of the invention comprises: a first flexible substrate 1 and a second flexible substrate 2 arranged oppositely; a first polarizer 3 arranged on a side of the first flexible substrate 1 facing away from the second flexible substrate 2; a second polarizer 4 arranged on a side of the second flexible substrate 2 facing away from the first flexible substrate 1; and a positive C plate compensation film 51 and a first negative A plate compensation film 52 arranged on the second flexible substrate 2; the positive C plate compensation film 51 is arranged between the second flexible substrate 2 and the first negative A plate compensation film 52.

A compensation film 5 is then formed with the positive C plate compensation film 51 and the first negative A plate compensation film 52 (and optionally, a second negative A plate compensation film 53 or a positive A plate compensation film 54). The compensation film 5 is used for overcoming the light leakage defect of a visual angle greater than zero in a dark state, which is caused due to the angle between the absorption axis of the first polarizer 3 and the absorption axis of the second polarizer 4 greater or less than 90°.

In the flexible liquid crystal display panel provided by the embodiment of the present invention, several compensation films are inserted between the first polarizer and the second polarizer. With such an arrangement, the light leakage defect of a visual angle greater than zero in a dark state can be overcome, which occurs since the absorption axis of the first polarizer and the absorption axis of the second polarizer are not perpendicular to each other.

It should be noted that since human eye is sensitive to green light, the following embodiments are illustrated mainly considering light leakage of an incident light with a wavelength of 550 nm.

In a practical implementation, in the flexible liquid crystal display panel provided by the embodiment of the present invention, a material of the first flexible substrate can be organic resin; alternatively, a material of the first flexible substrate can also be inorganic material such as glass, which is not limited herein. The following embodiments are illustrated in which a material of the first flexible substrate is flexible glass.

In a practical implementation, in the flexible liquid crystal display panel provided by the embodiment of the present invention, a material of the second flexible substrate can be polyimide (PI).

Certainly, the material of the first flexible substrate is not limited to glass; the first flexible substrate can also be made of other transparent inorganic material with a retardation of zero, which is not limited herein. The material of the second flexible substrate is not limited to PI; the second flexible substrate can also be made of other organic resin material, which is not limited herein.

In a practical implementation, the flexible liquid crystal display panel provided by the embodiment of the present invention can be a flexible liquid crystal display panel of Advanced Super Dimension Switch (ADS) type, or In-Plane Switch (IPS) type; alternatively, the flexible liquid crystal display panel provided by the embodiment of the present invention can also be a flexible liquid crystal display panel of Twisted Nematic (TN) type, which is not limited herein. The following embodiments of the present invention are illustrated by taking a flexible liquid crystal display panel of ADS type for example. As shown in FIG. 3a, FIG. 4a, FIG. 5a and FIG. 6a, the flexible liquid crystal display panel can also comprise: a liquid crystal cell 6 located between the first flexible substrate 1 and the second flexible substrate 2; the liquid crystal cell 6 comprises a common electrode and a pixel electrode insulated from each other, which are arranged on a side of the second flexible substrate 2 facing the first flexible substrate 1 to generate a transverse electric field parallel to the second flexible substrate 2.

Implementations of the flexible liquid crystal display panel are illustrated in detail below, in which four compensation film structures are applied respectively. The following four embodiments are illustrated without providing a color filter layer in the flexible liquid crystal display panel.

Figure 3A:
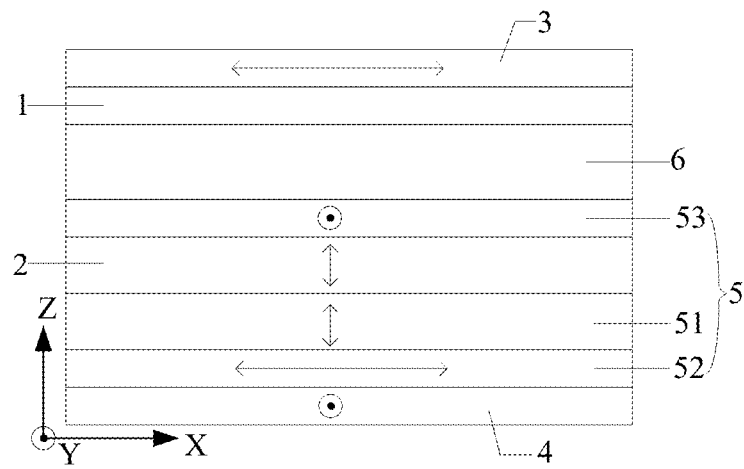
FIG. 3a is a structural schematic diagram of a flexible liquid crystal display panel provided by an embodiment of the present invention.

Example 1: as can be seen from FIG. 3a, the flexible liquid crystal display panel can further comprise a second negative A plate compensation film 53 arranged between the second flexible substrate 2 and the liquid crystal cell 6; the positive C plate compensation film 51 and the first negative A plate compensation film 52 are arranged on a side of the second flexible substrate 2 facing away from the liquid crystal cell 6. An optic axis of the second negative A plate compensation film 53 is parallel to an absorption axis of the second polarizer 4; an in-plane retardation Ro of the second negative A plate compensation film 53 is between −80 nm to −100 nm. An optic axis of the positive C plate compensation film 51 is perpendicular to a surface of the second flexible substrate 2; an in-plane retardation Ro of the positive C plate compensation film 51 is between 2320 nm to 2380 nm. An optic axis of the first negative A plate compensation film 52 is parallel to an absorption axis of the first polarizer 3; an in-plane retardation Ro of the first negative A plate compensation film 52 is between −80 nm to −100 nm. It should be noted that an optic axis of the second flexible substrate 2 is perpendicular to the surface of the second flexible substrate 2; an in-plane retardation Ro of the second flexible substrate 2 is 0 nm.

In a practical implementation, as shown in FIG. 3a, the absorption axis of the first polarizer 3 can be arranged as parallel to the X-axis; the absorption axis of the second polarizer 4 can be arranged as parallel to the Y-axis; the Z-axis is perpendicular to the second flexible substrate 2. The optic axis of the second negative A plate compensation film 53 is parallel to the Y-axis; the optic axis of the positive C plate compensation film 51 is parallel to the Z-axis; the optic axis of the first negative A plate compensation film 52 is parallel to the X-axis; the optic axis of the second flexible substrate 2 is parallel to the Z-axis.

Certainly, the absorption axis of the second polarizer 4 can also be arranged as parallel to the X-axis; the absorption axis of the first polarizer 3 can also be arranged as parallel to the Y-axis; the Z-axis is perpendicular to the second flexible substrate 2, which is not limited herein.

Optionally, in the flexible liquid crystal display panel provided by the embodiment of the present invention, the in-plane retardation Ro of the second negative A plate compensation film 53 is −90 nm.

Optionally, in the flexible liquid crystal display panel provided by the embodiment of the present invention, the in-plane retardation Ro of the positive C plate compensation film 51 is 2352 nm.

Optionally, in the flexible liquid crystal display panel provided by the embodiment of the present invention, the in-plane retardation Ro of the first negative A plate compensation film 52 is −90 nm.

Figure 3B:
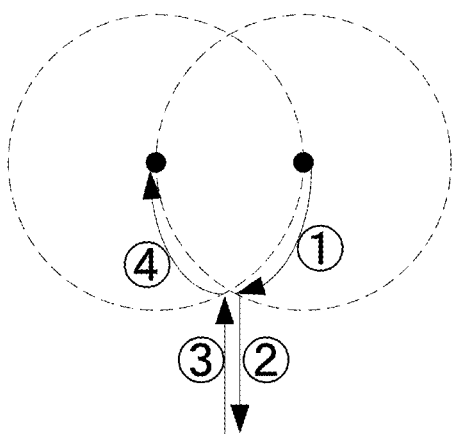

The compensation principle can be illustrated with a Poincare sphere; as shown in FIG. 3b, ① represents the first negative A plate compensation film 52; ② represents the positive C plate compensation film 51; ③ represents the second flexible substrate 2; and ④ represents the second negative A plate compensation film 53.

Figure 2:
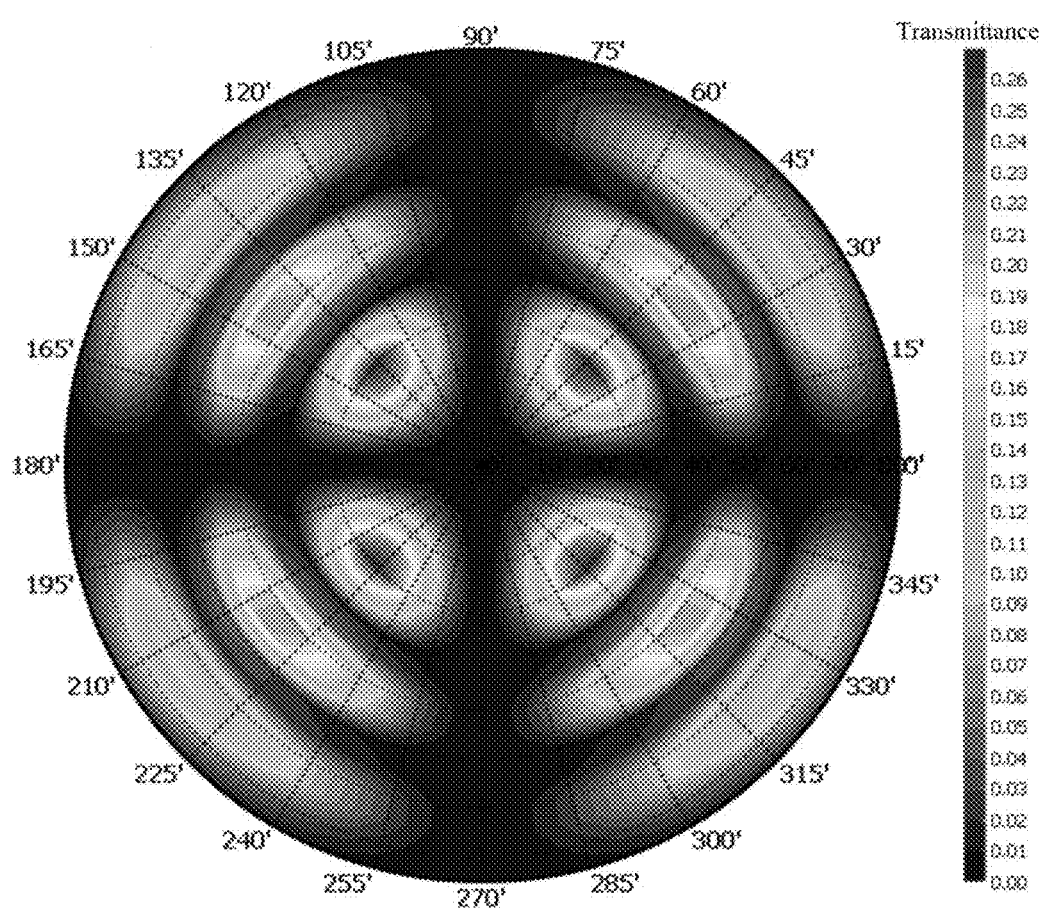
FIG. 2 is a simulated diagram of a transmittance in different visual angles of a flexible liquid crystal display panel in a dark state.
Figure 3C:
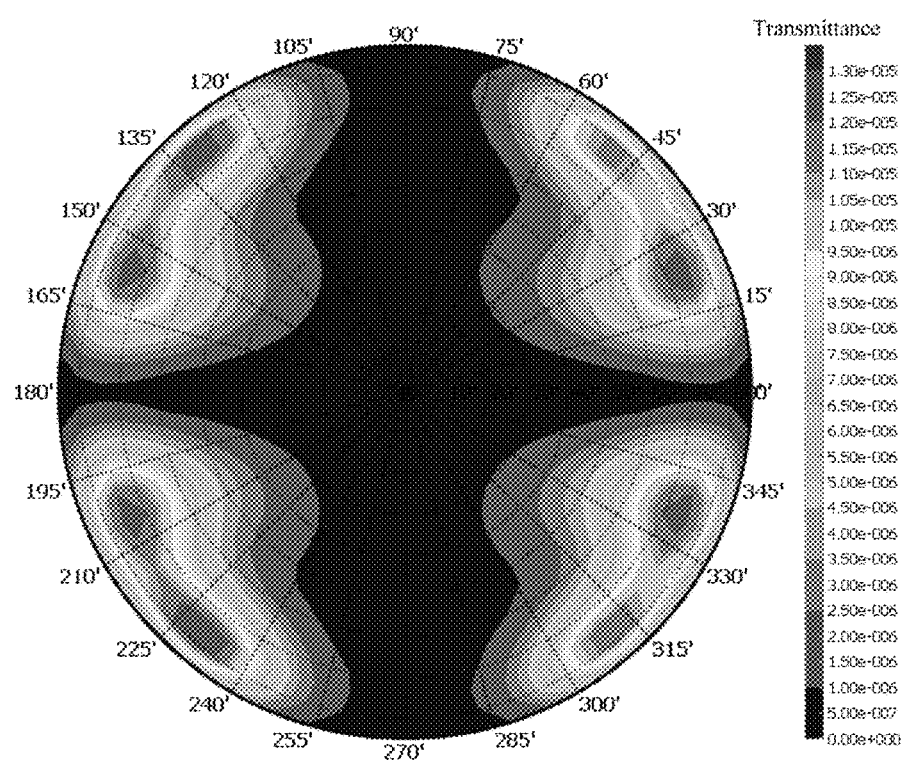
FIG. 3c is a simulated diagram of the transmittance in different visual angles for the flexible liquid crystal display panel shown in FIG. 3a in a dark state.

FIG. 3c is a simulated diagram of the transmittance in different visual angles for the flexible liquid crystal display panel shown in FIG. 3a in a dark state, in which the in-plane retardation Ro values of the compensation films are the above mentioned optional values respectively. As can be seen from FIG. 3c, the maximum transmittance of the flexible liquid crystal display panel in a dark state is only 0.000013. Compared with the situation without compensation as shown in FIG. 2, the flexible liquid crystal display panel shown in FIG. 3a overcomes the defect of light leakage effectively.

Figure 4A:
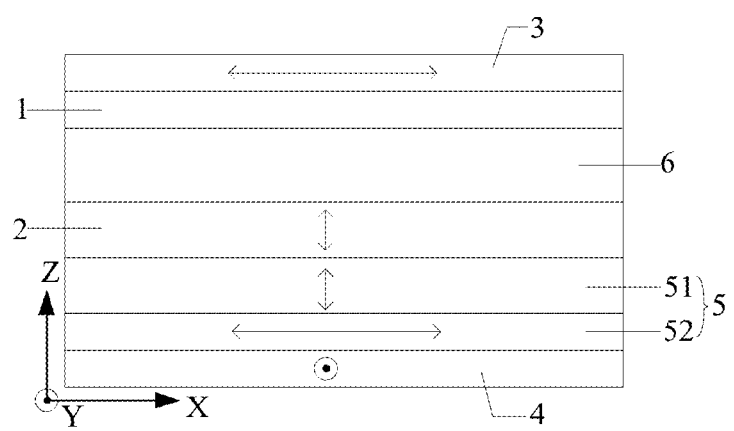
FIG. 4a is a structural schematic diagram of a flexible liquid crystal display panel provided by another embodiment of the present invention.

Example 2: as can be seen from FIG. 4a, the positive C plate compensation film 51 and the first negative A plate compensation film 52 are arranged on a side of the second flexible substrate 2 facing away from the liquid crystal cell 6. An optic axis of the positive C plate compensation film 51 is perpendicular to a surface of the second flexible substrate 2. An in-plane retardation Ro of the positive C plate compensation film 51 is between 2360 nm to 2440 nm. An optic axis of the first negative A plate compensation film 52 is parallel to an absorption axis of the first polarizer 3. An in-plane retardation Ro of the first negative A plate compensation film 52 is between −120 nm to −150 nm. It should be noted that an optic axis of the second flexible substrate 2 is perpendicular to the surface of the second flexible substrate 2; an in-plane retardation Ro of the second flexible substrate 2 is 0 nm.

In a practical implementation, as shown in FIG. 4a, the absorption axis of the first polarizer 3 can be arranged as parallel to the X-axis; the absorption axis of the second polarizer 4 can be arranged as parallel to the Y-axis; the Z-axis is perpendicular to the second flexible substrate 2. The optic axis of the positive C plate compensation film 51 is parallel to the Z-axis; the optic axis of the first negative A plate compensation film 52 is parallel to the X-axis; the optic axis of the second flexible substrate 2 is parallel to the Z-axis.

Certainly, the absorption axis of the second polarizer 4 can also be arranged as parallel to the X-axis; the absorption axis of the first polarizer 3 can also be arranged as parallel to the Y-axis; the Z-axis is perpendicular to the second flexible substrate 2, which is not limited herein.

Optionally, in the flexible liquid crystal display panel provided by the embodiment of the present invention, the in-plane retardation Ro of the positive C plate compensation film 51 is 2420 nm.

Optionally, in the flexible liquid crystal display panel provided by the embodiment of the present invention, the in-plane retardation Ro of the first negative A plate compensation film 52 is −137 nm.

Figure 4B:
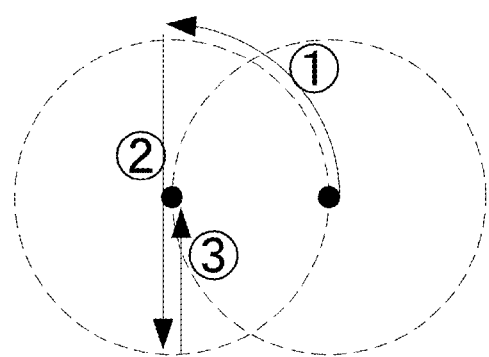

The compensation principle can be illustrated with a Poincare sphere; as shown in FIG. 4b, ① represents the first negative A plate compensation film 52; ② represents the positive C plate compensation film 51; and ③ represents the second flexible substrate 2.

Figure 4C:
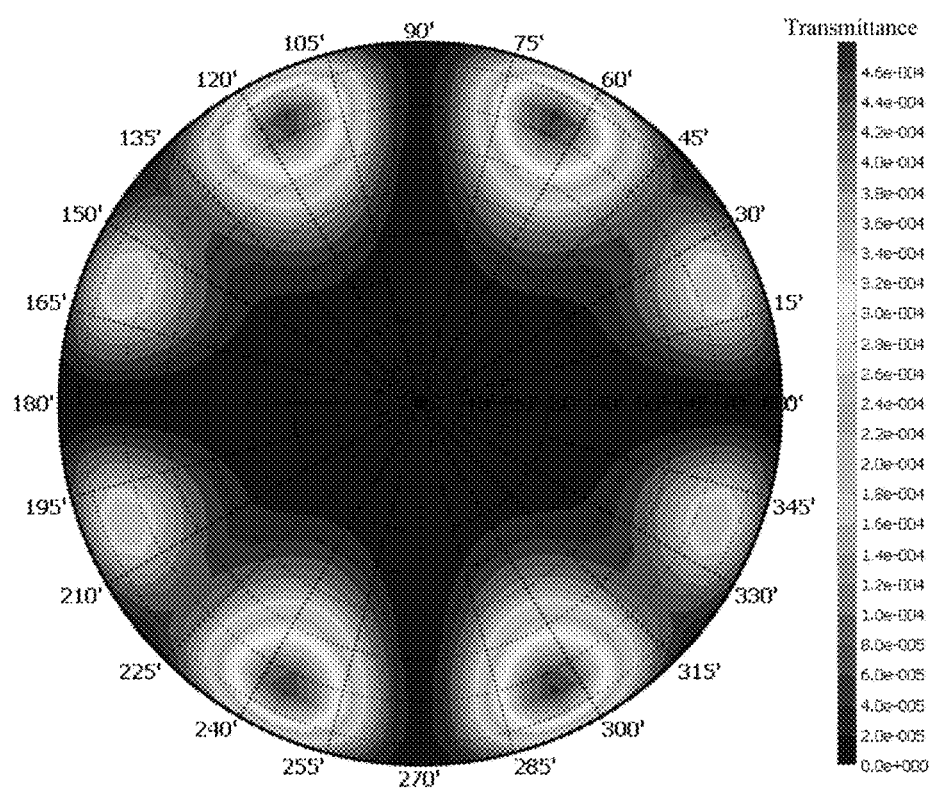
FIG. 4c is a simulated diagram of the transmittance in different visual angles for the flexible liquid crystal display panel shown in FIG. 4a in a dark state.

FIG. 4c is a simulated diagram of the transmittance in different visual angles for the flexible liquid crystal display panel shown in FIG. 4a in a dark state, in which the in-plane retardation Ro values of the compensation films are the above mentioned optional values respectively. As can be seen from FIG. 4c, the maximum transmittance of the flexible liquid crystal display panel in a dark state is only 0.00047. Compared with the situation without compensation as shown in FIG. 2, the flexible liquid crystal display panel shown in FIG. 4a overcomes the defect of light leakage effectively.

Figure 5A:
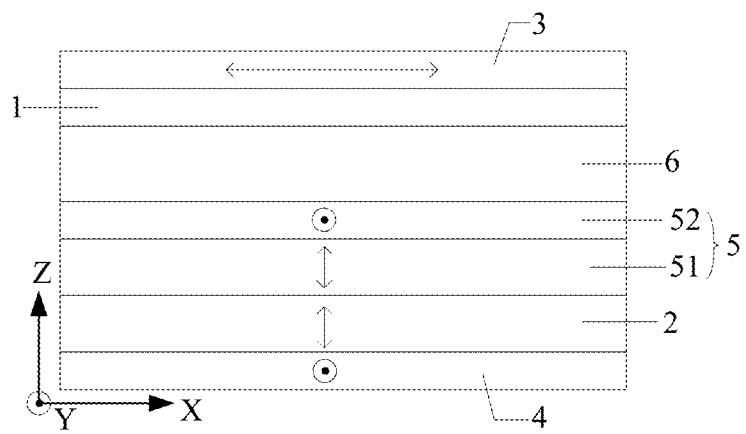
FIG. 5a is a structural schematic diagram of a flexible liquid crystal display panel provided by yet another embodiment of the present invention.

Example 3: as can be seen from FIG. 5a, the positive C plate compensation film 51 and the first negative A plate compensation film 52 are arranged between the second flexible substrate 2 and the liquid crystal cell 6. An optic axis of the positive C plate compensation film 51 is perpendicular to a surface of the second flexible substrate 2. An in-plane retardation Ro of the positive C plate compensation film 51 is between 2400 nm to 2450 nm. An optic axis of the first negative A plate compensation film 52 is parallel to an absorption axis of the second polarizer 4. An in-plane retardation Ro of the first negative A plate compensation film 52 is between −120 nm to −160 nm. It should be noted that an optic axis of the second flexible substrate 2 is perpendicular to the surface of the second flexible substrate 2; an in-plane retardation Ro of the second flexible substrate 2 is 0 nm.

In a practical implementation, as shown in FIG. 5a, the absorption axis of the first polarizer 3 can be arranged as parallel to the X-axis; the absorption axis of the second polarizer 4 can be arranged as parallel to the Y-axis; the Z-axis is perpendicular to the second flexible substrate 2. The optic axis of the positive C plate compensation film 51 is parallel to the Z-axis; the optic axis of the first negative A plate compensation film 52 is parallel to the Y-axis; the optic axis of the second flexible substrate 2 is parallel to the Z-axis.

Certainly, the absorption axis of the second polarizer 4 can also be arranged as parallel to the X-axis; the absorption axis of the first polarizer 3 can also be arranged as parallel to the Y-axis; the Z-axis is perpendicular to the second flexible substrate 2, which is not limited herein.

Optionally, in the flexible liquid crystal display panel provided by the embodiment of the present invention, the in-plane retardation Ro of the positive C plate compensation film 51 is 2410 nm.

Optionally, in the flexible liquid crystal display panel provided by the embodiment of the present invention, the in-plane retardation Ro of the first negative A plate compensation film 52 is −137 nm.

Figure 5B:
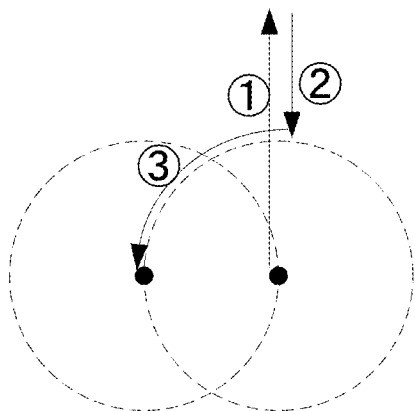

The compensation principle can be illustrated with a Poincare sphere; as shown in FIG. 5b, ① represents the second flexible substrate 2; ② represents the positive C plate compensation film 51; and ③ represents the first negative A plate compensation film 52.

Figure 5C:
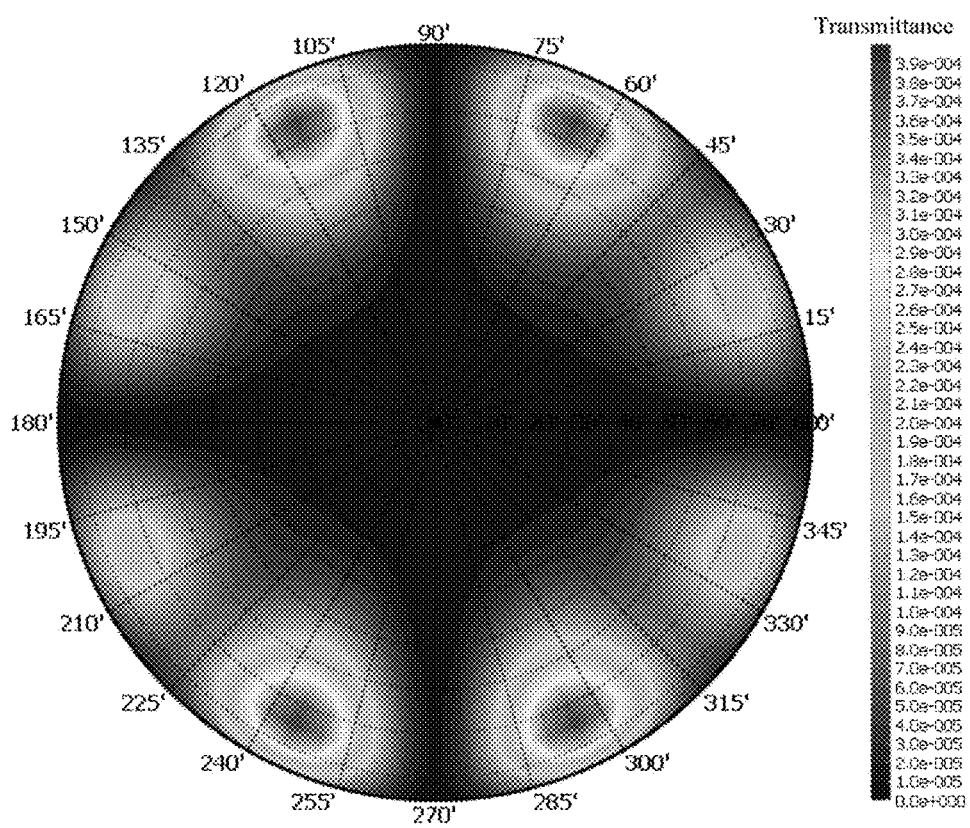
FIG. 5c is a simulated diagram of the transmittance in different visual angles for the flexible liquid crystal display panel shown in FIG. 5a in a dark state.

FIG. 5c is a simulated diagram of the transmittance in different visual angles for the flexible liquid crystal display panel shown in FIG. 5a in a dark state, in which the in-plane retardation Ro values of the compensation films are the above mentioned optional values respectively. As can be seen from FIG. 5c, the maximum transmittance of the flexible liquid crystal display panel in a dark state is only 0.00034. Compared with the situation without compensation as shown in FIG. 2, the flexible liquid crystal display panel shown in FIG. 5a overcomes the defect of light leakage effectively.

Figure 6A:
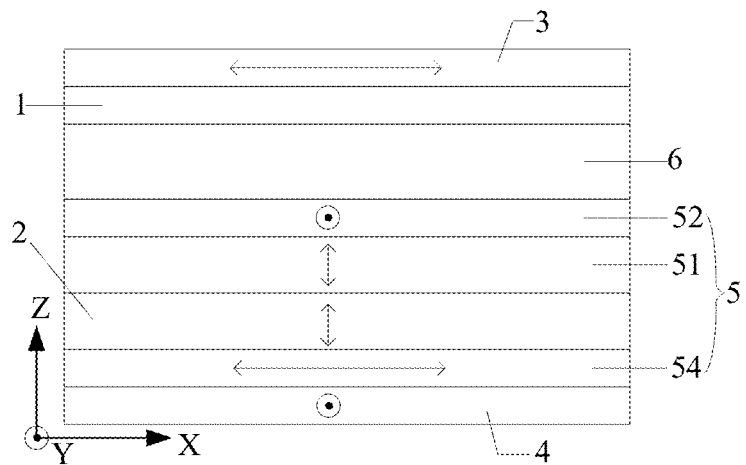
FIG. 6a is a structural schematic diagram of a flexible liquid crystal display panel provided by still another embodiment of the present invention.

Example 4: as can be seen from FIG. 6a, the flexible liquid crystal display panel can further comprise: a positive A plate compensation film 54 arranged between the second flexible substrate 2 and the second polarizer 4; the positive C plate compensation film 51 and the first negative A plate compensation film 52 are arranged between the second flexible substrate 2 and the liquid crystal cell 6. An optic axis of the positive C plate compensation film 51 is perpendicular to a surface of the second flexible substrate 2. An in-plane retardation Ro of the positive C plate compensation film 51 is between 2450 nm to 2520 nm. An optic axis of the first negative A plate compensation film 52 is parallel to an absorption axis of the second polarizer 4. An in-plane retardation Ro of the first negative A plate compensation film 52 is between −80 nm to −110 nm. An optic axis of the positive A plate compensation film 54 is parallel to an absorption axis of the first polarizer 3. An in-plane retardation Ro of the positive A plate compensation film 54 is between 50 nm to 90 nm. It should be noted that an optic axis of the second flexible substrate 2 is perpendicular to the surface of the second flexible substrate 2; an in-plane retardation Ro of the second flexible substrate 2 is 0 nm.

In a practical implementation, as shown in FIG. 6a, the absorption axis of the first polarizer 3 can be arranged as parallel to the X-axis; the absorption axis of the second polarizer 4 can be arranged as parallel to the Y-axis; the Z-axis is perpendicular to the second flexible substrate 2. The optic axis of the positive C plate compensation film 51 is parallel to the Z-axis; the optic axis of the first negative A plate compensation film 52 is parallel to the Y-axis; the optic axis of the positive A plate compensation film 54 is parallel to the X-axis; the optic axis of the second flexible substrate 2 is parallel to the Z-axis.

Certainly, the absorption axis of the second polarizer 4 can also be arranged as parallel to the X-axis; the absorption axis of the first polarizer 3 can also be arranged as parallel to the Y-axis; the Z-axis is perpendicular to the second flexible substrate 2, which is not limited herein.

Optionally, in the flexible liquid crystal display panel provided by the embodiment of the present invention, the in-plane retardation Ro of the positive C plate compensation film 51 is 2480 nm.

Optionally, in the flexible liquid crystal display panel provided by the embodiment of the present invention, the in-plane retardation Ro of the first negative A plate compensation film 52 is −99 nm.

Optionally, in the flexible liquid crystal display panel provided by the embodiment of the present invention, the in-plane retardation Ro of the positive A plate compensation film 54 is 70 nm.

Figure 6B:
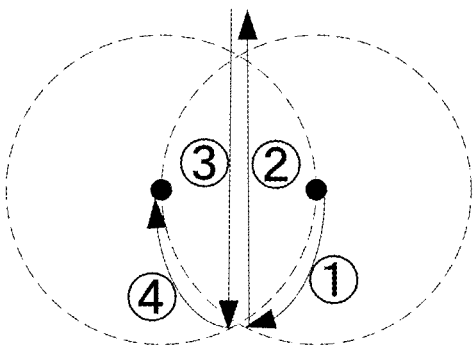

The compensation principle can be illustrated with a Poincare sphere; as shown in FIG. 6b, ① represents the positive A plate compensation film 54; ② represents the second flexible substrate 2; ③ represents the positive C plate compensation film 51; and ④ represents the first negative A plate compensation film 52.

Figure 6C:
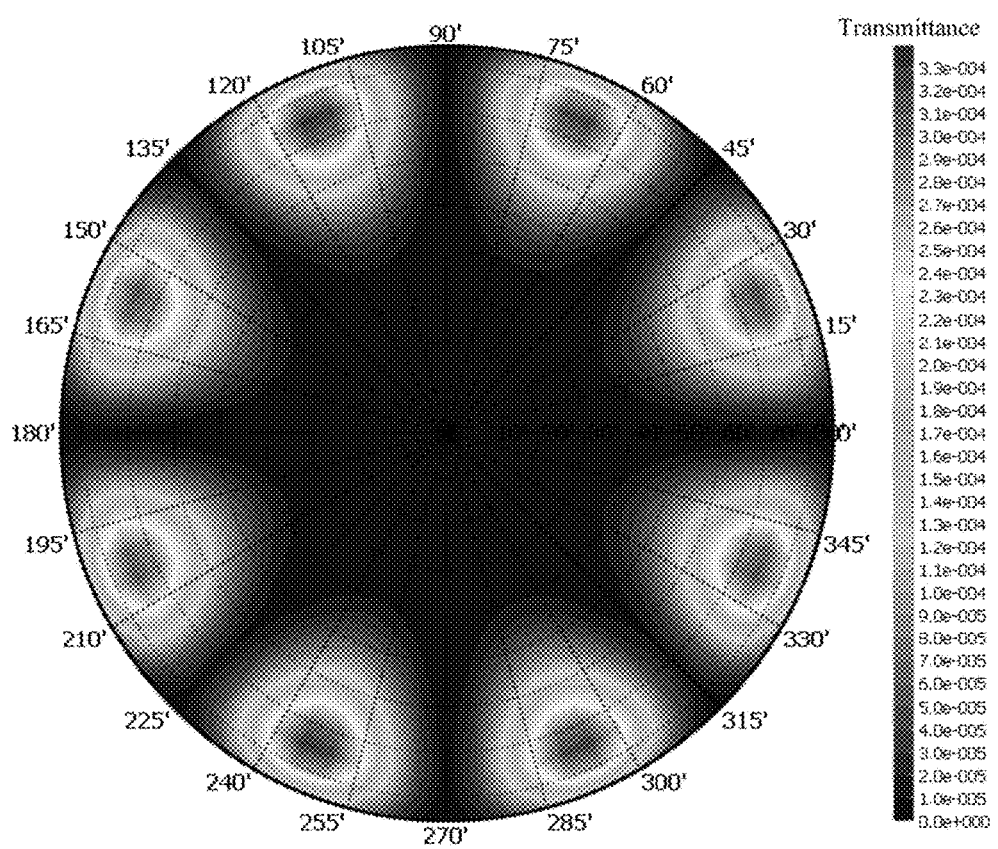
FIG. 6c is a simulated diagram of the transmittance in different visual angles for the flexible liquid crystal display panel shown in FIG. 6a in a dark state.

FIG. 6c is a simulated diagram of the transmittance in different visual angles for the flexible liquid crystal display panel shown in FIG. 6a in a dark state, in which the in-plane retardation Ro values of the compensation films are the above mentioned optional values respectively. As can be seen from FIG. 6c, the maximum transmittance of the flexible liquid crystal display panel in a dark state is only 0.00039. Compared with the situation without compensation as shown in FIG. 2, the flexible liquid crystal display panel shown in FIG. 6a overcomes the defect of light leakage effectively.

Based on the same inventive concept, an embodiment of the present invention provides a display device comprising the above mentioned flexible liquid crystal display panel.

The display device can be any product or component with display function, such as mobile phone, tablet computer, TV, display, notebook computer, digital photo frame and navigator. The implementation of the display device can refer to the embodiments of the above mentioned flexible liquid crystal display panel, which will not be repeated herein.

The embodiments of the present invention provide a flexible liquid crystal display panel and a display device. The flexible liquid crystal display panel comprises: a first flexible substrate and a second flexible substrate arranged oppositely; a first polarizer arranged on a side of the first flexible substrate facing away from the second flexible substrate; a second polarizer arranged on a side of the second flexible substrate facing away from the first flexible substrate; and a positive C plate compensation film and a first negative A plate compensation film arranged on the second flexible substrate; the positive C plate compensation film is arranged between the second flexible substrate and the first negative A plate compensation film. Several compensation films are inserted between the first polarizer and the second polarizer, the light leakage defect of a visual angle greater than zero in a dark state can thus be overcome, which is caused due to the angle between the absorption axis of the first polarizer 3 and the absorption axis of the second polarizer 4 being greater or less than 90°. With such an arrangement, the light leakage defect of a visual angle greater than zero in a dark state can be overcome, which occurs since the absorption axis of the first polarizer and the absorption axis of the second polarizer are not perpendicular to each other.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A flexible liquid crystal display panel comprising: a first flexible substrate and a second flexible substrate arranged oppositely; a first polarizer arranged on a side of the first flexible substrate facing away from the second flexible substrate; a second polarizer arranged on a side of the second flexible substrate facing away from the first flexible substrate; a liquid crystal cell located between the first flexible substrate and the second flexible substrate; and
   a positive C plate compensation film and a first negative A plate compensation film arranged on the second flexible substrate;
   wherein the positive C plate compensation film, the first negative A plate compensation film and the second flexible substrate are arranged on a bottom side of the liquid crystal cell; the positive C plate compensation film is arranged between the second flexible substrate and the first negative A plate compensation film.

2. The flexible liquid crystal display panel according to claim 1, wherein the liquid crystal cell comprises a common electrode and a pixel electrode insulated from each other, which are arranged on a side of the second flexible substrate facing the first flexible substrate to generate a transverse electric field parallel to the second flexible substrate.

3. The flexible liquid crystal display panel according to claim 2, further comprising: a second negative A plate compensation film arranged between the second flexible substrate and the liquid crystal cell; the positive C plate compensation film and the first negative A plate compensation film being arranged on a side of the second flexible substrate facing away from the liquid crystal cell;

wherein an optic axis of the first negative A plate compensation film is parallel to an absorption axis of the first polarizer; an in-plane retardation of the first negative A plate compensation film is between −80 nm to −100 nm;

wherein an optic axis of the positive C plate compensation film is perpendicular to a surface of the second flexible substrate; an in-plane retardation of the positive C plate compensation film is between 2320 nm to 2380 nm;

wherein an optic axis of the second negative A plate compensation film is parallel to an absorption axis of the second polarizer; an in-plane retardation of the second negative A plate compensation film is between −80 nm to −100 nm.

4. The flexible liquid crystal display panel according to claim 2, wherein the positive C plate compensation film and the first negative A plate compensation film are arranged on a side of the second flexible substrate facing away from the liquid crystal cell;

wherein an optic axis of the positive C plate compensation film is perpendicular to a surface of the second flexible substrate; an in-plane retardation of the positive C plate compensation film is between 2360 nm to 2440 nm;

wherein an optic axis of the first negative A plate compensation film is parallel to an absorption axis of the first polarizer; an in-plane retardation of the first negative A plate compensation film is between −120 nm to −150 nm.

5. The flexible liquid crystal display panel according to claim 2, wherein the positive C plate compensation film and the first negative A plate compensation film are arranged between the second flexible substrate and the liquid crystal cell;

wherein an optic axis of the positive C plate compensation film is perpendicular to a surface of the second flexible substrate; an in-plane retardation of the positive C plate compensation film is between 2400 nm to 2450 nm;

wherein an optic axis of the first negative A plate compensation film is parallel to an absorption axis of the second polarizer; an in-plane retardation of the first negative A plate compensation film is between −120 nm to −160 nm.

6. The flexible liquid crystal display panel according to claim 2, further comprising: a positive A plate compensation film arranged between the second flexible substrate and the second polarizer; the positive C plate compensation film and the first negative A plate compensation film being arranged between the second flexible substrate and the liquid crystal cell;

wherein an optic axis of the positive C plate compensation film is perpendicular to a surface of the second flexible substrate; an in-plane retardation of the positive C plate compensation film is between 2450 nm to 2520 nm;

wherein an optic axis of the first negative A plate compensation film is parallel to an absorption axis of the second polarizer; an in-plane retardation of the first negative A plate compensation film is between −80 nm to −110 nm;

wherein an optic axis of the positive A plate compensation film is parallel to an absorption axis of the first polarizer; an in-plane retardation of the positive A plate compensation film is between 50 nm to 90 nm.

7. The flexible liquid crystal display panel according to claim 1, wherein an optic axis of the second flexible substrate is perpendicular to a surface of the second flexible substrate.

8. The flexible liquid crystal display panel according to claim 1, wherein a material of the first flexible substrate is flexible glass.

9. The flexible liquid crystal display panel according to claim 1, wherein a material of the second flexible substrate is organic resin.

10. The flexible liquid crystal display panel according to claim 9, wherein a material of the second flexible substrate is polyimide.

11. A display device comprising the flexible liquid crystal display panel according to claim 1.

12. The display device according to claim 11, wherein the liquid crystal cell comprises a common electrode and a pixel electrode insulated from each other, which are arranged on a side of the second flexible substrate facing the first flexible substrate to generate a transverse electric field parallel to the second flexible substrate.

13. The display device according to claim 12, further comprising: a second negative A plate compensation film arranged between the second flexible substrate and the liquid crystal cell; the positive C plate compensation film and the first negative A plate compensation film being arranged on a side of the second flexible substrate facing away from the liquid crystal cell;

wherein an optic axis of the first negative A plate compensation film is parallel to an absorption axis of the first polarizer; an in-plane retardation of the first negative A plate compensation film is between −80 nm to −100 nm;

wherein an optic axis of the positive C plate compensation film is perpendicular to a surface of the second flexible substrate; an in-plane retardation of the positive C plate compensation film is between 2320 nm to 2380 nm;

wherein an optic axis of the second negative A plate compensation film is parallel to an absorption axis of the second polarizer; an in-plane retardation of the second negative A plate compensation film is between −80 nm to −100 nm.

14. The display device according to claim 12, wherein the positive C plate compensation film and the first negative A plate compensation film are arranged on a side of the second flexible substrate facing away from the liquid crystal cell;

wherein an optic axis of the positive C plate compensation film is perpendicular to a surface of the second flexible substrate; an in-plane retardation of the positive C plate compensation film is between 2360 nm to 2440 nm;

wherein an optic axis of the first negative A plate compensation film is parallel to an absorption axis of the first polarizer; an in-plane retardation of the first negative A plate compensation film is between −120 nm to −150 nm.

15. The display device according to claim 12, wherein the positive C plate compensation film and the first negative A plate compensation film are arranged between the second flexible substrate and the liquid crystal cell;

wherein an optic axis of the positive C plate compensation film is perpendicular to a surface of the second flexible substrate; an in-plane retardation of the positive C plate compensation film is between 2400 nm to 2450 nm;

wherein an optic axis of the first negative A plate compensation film is parallel to an absorption axis of the second polarizer; an in-plane retardation of the first negative A plate compensation film is between −120 nm to −160 nm.

16. The display device according to claim 12, further comprising: a positive A plate compensation film arranged between the second flexible substrate and the second polarizer; the positive C plate compensation film and the first negative A plate compensation film being arranged between the second flexible substrate and the liquid crystal cell;

wherein an optic axis of the positive C plate compensation film is perpendicular to a surface of the second flexible substrate; an in-plane retardation of the positive C plate compensation film is between 2450 nm to 2520 nm;

wherein an optic axis of the first negative A plate compensation film is parallel to an absorption axis of the second polarizer; an in-plane retardation of the first negative A plate compensation film is between −80 nm to −110 nm;

wherein an optic axis of the positive A plate compensation film is parallel to an absorption axis of the first polarizer; an in-plane retardation of the positive A plate compensation film is between 50 nm to 90 nm.

17. The display device according to claim 11, wherein an optic axis of the second flexible substrate is perpendicular to a surface of the second flexible substrate.

18. The display device according to claim 11, wherein a material of the first flexible substrate is flexible glass.

19. The display device according to claim 11, wherein a material of the second flexible substrate is organic resin.

20. The display device according to claim 19, wherein a material of the second flexible substrate is polyimide.

* * * * *